UNITED STATES PATENT OFFICE.

BRODER LUDWIG JENSEN, OF LAKE CITY, COLORADO.

POISON FOR PRAIRIE-DOGS.

1,005,224.          Specification of Letters Patent.      Patented Oct. 10, 1911.

No Drawing.      Application filed June 22, 1911. Serial No. 634,778.

*To all whom it may concern:*

Be it known that I, BRODER LUDWIG JENSEN, a citizen of the United States, residing at Lake City, in the county of Hinsdale, State of Colorado, have invented certain new and useful Improvements in Poison for Prairie-Dogs; and I do hereby declare the following to be a full, clear, and exact description of the invention, such as will enable others skilled in the art to which it appertains to make and use the same.

My invention relates to poisons for the extermination of prairie dogs and like rodents and the object of my invention is to provide a composition of the above described character, which while effective against prairie dogs is not attractive to other animals.

A further object of my invention is to provide a poisonous compound having a non-soluble element contained therein by which means the compound, will to a great extent, be kept from dissolving and entering the ground when scattered thereon.

A further object of my invention is to provide a poison which, while effective will at the same time cause the animal consuming the same as little pain as possible.

With these objects in view the method of making my improved compound will be hereinafter more fully described and the formula thereof given.

My improved compound consists primarily of a mixture of barium carbonate, salt, resin and opium together with a fruit juice. A suitable composition or compound may be prepared in accordance with the following illustrative specific formula, it being understood however that the proportions here given may be varied if desired without in any way departing from the scope of my invention.

Barium carbonate _____ 2 lbs.
Salt _____ 50 lbs.
Resin _____ ½ lb.
Opium _____ ¼ lb.
The juice of one pound of currants.

In making the compound the resin is finely powdered and inter-mixed with the salt, the barium carbonate is then boiled in one gallon of water and while still hot the opium is added to the solution thus formed, the currants are also boiled in a half gallon of water and the juice thus obtained is strained off. This currant juice is then added to the barium carbonate solution after which the mixture of salt and resin is also added and the whole is thoroughly mixed to form a paste which, is then dried and when so dried forms a powder. The resin contained in this composition being insoluble renders the composition more effective by making it somewhat impervious to water. The salt is particularly attractive to prairie dogs as also is the currant juice. The opium is employed because of its effect in deadening the pain of the animal poisoned and any suitable narcotic may be employed in its place if desired.

What is claimed is:—

1. A prairie dog eradicator comprising intimately mixed barium carbonate, opium and a baiting material.

2. A prairie dog eradicator comprising barium carbonate, powdered resin, salt, opium, and a fruit juice.

3. A prairie dog eradicator comprising fifty parts salt, one-half part powdered resin, two parts barium carbonate and one-fourth part powdered opium all mixed together substantially as described.

4. A prairie dog eradicator comprising barium carbonate, a narcotic, and a baiting material.

In testimony whereof, I affix my signature, in presence of two witnesses.

BRODER LUDWIG JENSEN.

Witnesses:
  H. A. AVERY,
  BUEL R. WOOD.

Copies of this patent may be obtained for five cents each, by addressing the "Commissioner of Patents, Washington, D. C."